Nov. 17, 1936.　　　　T. N. ADLAM　　　　2,060,844
HEATING SYSTEM
Filed June 22, 1935
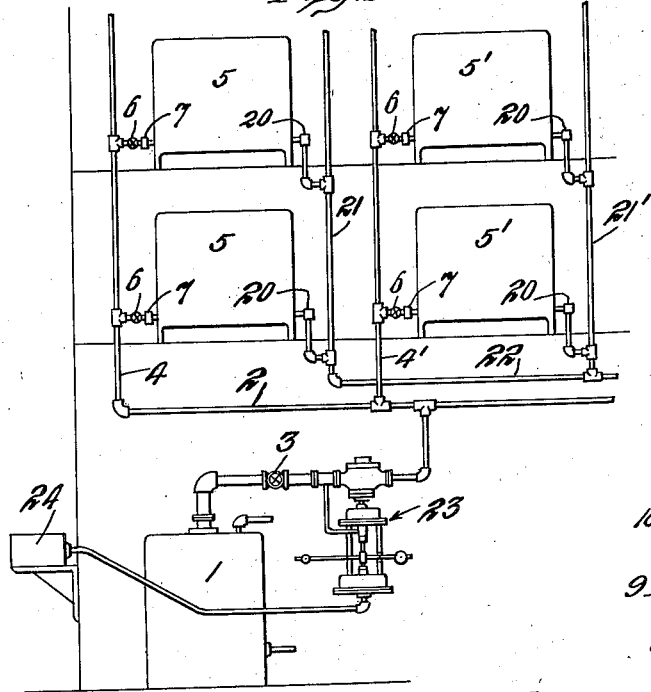
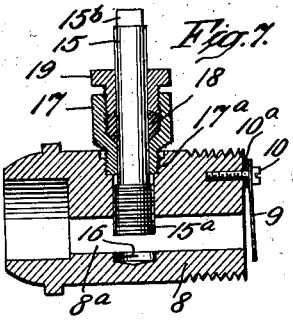
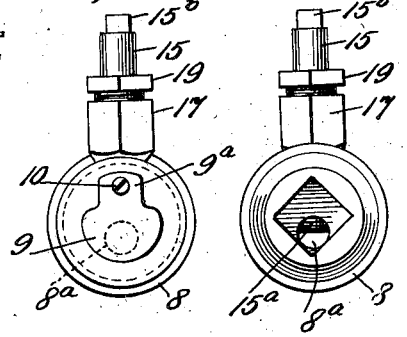
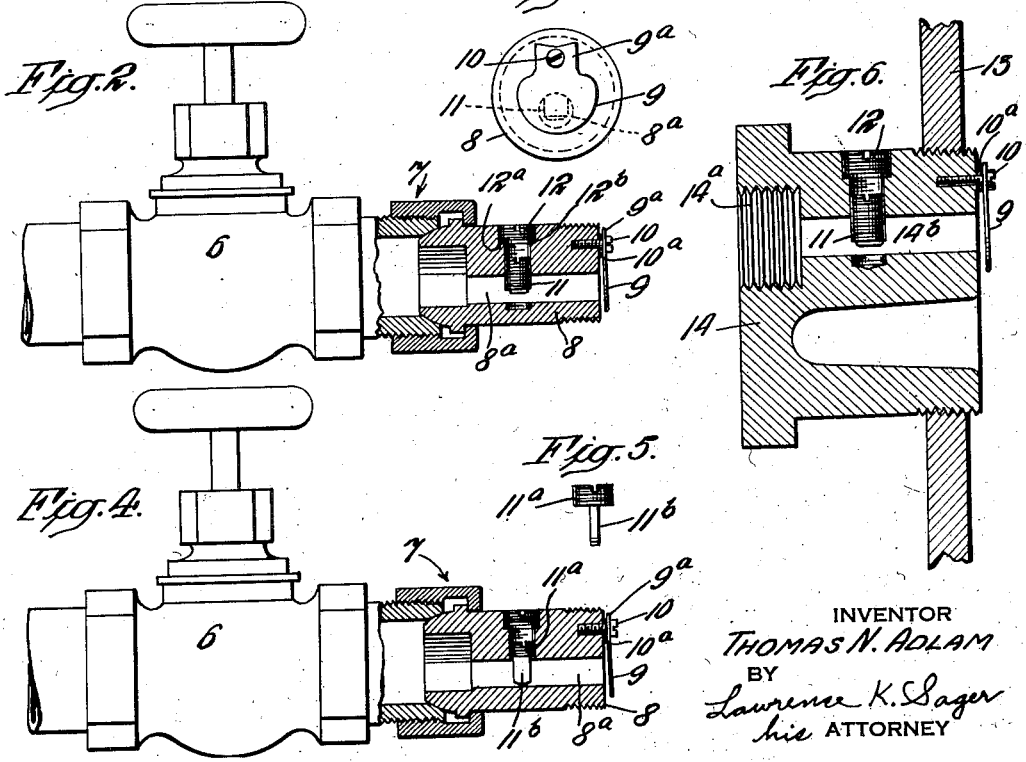
INVENTOR
*Thomas N. Adlam*
BY *Lawrence K. Sager*
his ATTORNEY Patented Nov. 17, 1936

2,060,844

UNITED STATES PATENT OFFICE 2,060,844

HEATING SYSTEM

Thomas Napier Adlam, West Orange, N. J.

Application June 22, 1935, Serial No. 27,965

5 Claims. (Cl. 237—67)

This invention relates to heating systems wherein it is desirable to adjust the size of an opening through which steam, or other heating fluid, passes to a heating unit such as a radiator, or to a group of such units. The invention is particularly applicable to a heating system where graduator valves are automatically controlled to affect the supply of steam to radiators, such valves being located in the inlet connections to the radiators. A heating system of that character is described and claimed in the pending application of Herbert J. Clement Wells filed July 23, 1934, Serial No. 736,507. The invention is also applicable to another type of heating system wherein restricted orifices are used for controlling the distribution of the steam to the different radiators of the system, such orifices being so proportioned in their fixed inlet area to the heating elements, as to control the distribution of the heating medium in an endeavor to secure a desired proportionate distribution.

The object of the present invention is to provide convenient means for adjustment of the openings controlled by the graduator valves of the above identified application and for providing convenient means for adjustment of the size of any openings leading to the heating units. In the improvement of the above identified application, the opening to the radiator controlled by the graduating valve must be of sufficient size to supply the maximum amount of heating medium to the radiator under maximum heating requirements as controlled by the graduator valve under such conditions. On the other hand, if the size of this controlled opening is greater than required for maximum heating conditions, then the heated space will receive more heat than desirable as controlled by the graduator valve. Owing to the difficulty of predetermining the proper size of such opening for the requisite supply of heating, on account of various factors affecting the heat requirements, such as the nature of the exposure of different sides of a building, the variable amount of radiation, height of floor space, the character of the supply piping and connections and various other factors, it sometimes becomes desirable to change the size of the opening controlled by the graduator valve, after the installation of the system has been completed. Likewise in that type of installation where fixed orifices are depended upon for assisting in the proper proportionate distribution of heat to the radiators, it is difficult to predetermine the size of the fixed orifice. When it becomes desirable to change the size of the opening controlled by the graduator valve, or to change the size of the fixed orifice after the heating system has been installed, it necessitates the disconnection of the piping from the radiators for the purpose of internal adjustment of said opening, or for replacing the orifice washer with another having a proper size of fixed orifice.

The present invention permits ready adjustment of the opening controlled by the graduator valve and of the fixed orifice without the necessity of disconnecting the pipe connections. The adjustment may be accomplished externally to any desired degree by merely turning an element or otherwise adjusting it. A suitable protecting cover may be used if desired. The invention will be readily undersood from the following description and accompanying drawing which illustrates preferred embodiments thereof.

Figure 1 is a diagram illustrating a heating system to which this invention is applicable.

Fig. 2 is a side view partly in section of a connection to a heating element or radiator.

Fig. 3 is an end view of the pipe engaging the heating unit or radiator.

Fig. 4 is a side view partly in section of the connection to a radiator showing a modified form of adjusting means.

Fig. 5 is an end view of the adjustable element of Fig. 4.

Fig. 6 is a sectional view showing the invention applied to the radiator bushing.

Fig. 7 is a sectional view showing a modified form of the invention applied to the pipe or nipple engaging the heating unit or radiator. Fig. 8 is an end view thereof. Fig. 9 is an opposite end view thereof.

Referring to Fig. 1, a heating system is indicated, the source of supply of the heating medium being shown as a boiler 1 which supplies steam to a supply main 2 through the usual manual valve 3. A riser 4 is shown connected to this main and extends upwardly to supply a plurality of heating elements or radiators 5, two of such radiators being indicated. From the main 2 also extends another riser 4' which is indicated as supplying another series of radiators 5', two of these being indicated on the drawing. The connection to each radiator is shown as including the usual hand stop valve 6 and also is provided in each inlet connection with a graduating valve indicated as inserted at 7 at the outlet end of the hand valve 6. The usual steam trap 20 is connected in the outlet of each radiator and these are in turn connected respectively to the return pipes 21 and 21' which are connected to a common return 22. The boiler has connected thereto any suitable type of apparatus for maintaining the water level therein which need not be particularly described. An automatic controlling valve, indicated generally by the character 23 is connected in the pipe leading from the boiler to the supply main 2 for automatically controlling the volume of steam supplied to the heating system in accordance with a temperature responsive device 24 located at a key location, which may be external to the building. This type of controlling apparatus is described in the above identified application and operates to control the volume of steam supplied to the heating system in accordance with the heating requirements as determined by the responsive device 24. Instead of using an automatic device for controlling the volume of steam supplied to the system, a device may be used which will control the pressure of the steam supplied to the system according to weather requirements, or any other type of automatic control may be used, or dependence may be had upon manual control of the steam supply.

Figs. 2 and 3 are enlarged views of the hand valve 6 and coupling 7 to which this invention is applied. The nipple 8 is adapted to be screwed into the radiator inlet and has an opening 8a for the passage of steam thereto. At the inner end of the nipple 8 is located the graduator valve element 9. This consists of a circular portion which extends over and covers the inner end of the opening 8a and an outwardly extending projection 9a. The valve element is held in place by a screw 10 which passes through the projection 9a and engages the end of the nipple 8, a thin washer 10a being interposed between the projection 9a and the end of the nipple for spacing the valve element slightly from the nipple. This gives a small initial opening of the valve, or the valve element may be bent outward slightly to give it an initial set opening. The element 9 is flexible and responds to the dynamic pressure of the steam passing through the valve to open to a greater degree, the greater the dynamic pressure. The flexible valve element is made of a thin sheet material, such as "Monel metal" or bronze or similar material which will not materially oxidize under normal use and which also has proper flexibility for securing the desired control.

The opening 8a must be of sufficient size, or more than sufficient to supply the maximum amount of heating medium to the radiator under maximum heating requirements. Adjustment of this opening is sometimes desirable after the installation of the heating system is completed, for the reasons previously explained herein. It may be desired to reduce the amount of effective opening of the passage 8a or to increase it. By the present invention this may be easily accomplished without disconnection of the pipe connections.

In the form of the invention shown in Figs. 2 and 3, the side of the nipple 8 is tapped to receive a radially extending screw 11 which is adapted to extend into and across the opening 8a to any extent desired and may be adjusted to give any desired effective opening to the passage 8a. In order to protect this adjustable device from unauthorized tampering, a suitable protective cover is provided. In the form shown this is a flat screw 12 of larger diameter than that of screw 11 and concentric therewith. It has a threaded engagement with the nipple 8 and seats against a shoulder 12a of the nipple with an intervening washer 12b to seal the joint. The axial length of the threaded portion of the nipple 8 which receives the screw 11 should be such as to permit sufficient adjustment of screw 11 inwardly and outwardly for securing the desired range of control of opening 8a.

Instead of having the usual slot for a screw driver in the screws 11 and 12, the outer ends of these screws, or of either one of them, may be specially formed to receive a special tool for turning to further prevent unauthorized adjustment. Ordinarily specially formed heads to take a special tool will not be necessary.

Figs. 4 and 5 are similar to the structure of Figs. 2 and 3 except as to the form of the adjustable device 11. In Figs. 4 and 5, this device is in the form of a threaded head portion 11a which engages the inner threaded portion of the nipple and has a flat portion 11b extending across the opening 8a. This flat portion may be circular and of a diameter somewhat less than that of the opening 8a, or may have straight sides as shown in Fig. 4. Obviously a slight turn of the device 11a, 11b will result in a considerable change of the effective opening of the passage 8a. When the plane of the portion 11b is at right angles to the axis of passage 8a, the effective opening is closed to the maximum amount, and when turned 90° therefrom, the opening is effective a maximum amount. Intermediate positions give any desired adjustment.

Fig. 6 shows a portion 13 of a radiator and the usual radiator bushing 14 adapted to receive the inlet pipe at the threaded opening 14a. The present invention is shown applied to the bushing 14, instead of to the inlet pipe as in Figs. 1 to 4. In Fig. 6 the intake passage 14b of the bushing corresponds to the opening 8a of the nipple 8. The side wall of the bushing is tapped to receive the screws 11 and 12 as in Fig. 2. The inner end of the opening 14b has applied thereto the graduator valve 9 as in Figs. 2 and 4. The method of adjustment and control of the opening 14b is the same as that already described.

The adjustable means as described may similarly be applied to control the inlet passage to a radiator where no graduator valve is used. Where fixed orifices are used, it is customary to place washers having a desired size of central opening, in the inlet pipes to the radiators. When it is desired to change these washers to obtain an increased or a decreased amount of steam delivery to the radiators, it is necessary to disconnect the piping and replace the washers by others having different size of orifices. By the present invention the effective opening to the radiators may be readily adjusted as desired without disconnecting the piping, by merely turning the adjustable device 11 or 11b to the required amount. Re-adjustment when necessary may similarly be conveniently made. The washers with fixed orifices may or may not also be used in the initial installation. If used, the size of the orifices should be large enough to give sufficient heating of the radiator and then reduced as desired by use of the present invention.

Figs. 7 to 9 show a modified form of the invention applied to the nipple 8. In this form the adjustable device is exposed outside of the nipple so that it can be adjusted without the necessity of using the sealing element 12 of the prior figures. In Figs. 7 to 9, the adjustable element is in the form of a cylindrical rod 15 the inner end 15a of which is threaded and has a threaded engagement through the side of the nipple 8. The outer end of the element 15 has a square head 15b adapted to receive a wrench for turning head to the desired position of adjustment. As shown in Fig. 7 the opposite side of the nipple 8 from which the element 15 enters, is tapped at 16 where it adjoins the opening 8a, as shown in Fig. 7, to permit the element 15 to enter therein and thereby effect a quite complete closure of the opening 8a when desired. A stuffing box is provided to seal the nipple against escape of steam at the element 15. This is formed by a hollow nut 17 having its inner end 17a threaded to engage a threaded portion of the nipple 8 and seating against a shoulder thereof. The nut 17 is of larger size at its upper portion and adapted to receive stuffing box material 18 around the element 15. A nut 19 has a threaded engagement with the interior of the nut 17 and engages the stuffing box material 18 at its inner end to compress the same and form a sealed joint around the element 15. Evidently the element 15 may be turned readily to adjust the degree of effective opening of the passage 8a as required.

Although particular embodiments of the invention are shown and described, various modifications may be made without departing from the scope thereof.

I claim:

1. In a heating system, the combination of a heating unit, an inlet pipe connection having a passage for supplying the heating medium, a flexible graduator valve controlling the passage of the heating medium through said connection in response to the dynamic pressure of the medium passing through said passage, and means for adjusting the effective amount of said passage.

2. In a heating system, the combination of a heating unit, an inlet pipe connection having a passage for supplying the heating medium, a flexible graduator valve controlling the passage of the heating medium through said connection in response to the dynamic pressure of the medium passing through said passage, and means for adjusting the effective amount of said passage, said means comprising an adjustable device extending across said passage.

3. In a heating system, the combination of a heating unit, an inlet pipe connection having a passage for supplying the heating medium, a flexible graduator valve controlling the passage of the heating medium through said connection in response to the dynamic pressure of the medium passing through said passage, means for adjusting the effective amount of said passage, said means comprising an adjustable device extending across said passage, and means for externally concealing said device.

4. In a heating system, the combination of a heating unit, an inlet pipe connection having a passage for supplying the heating medium, a flexible graduator valve controlling the passage of the heating medium through said connection in response to the dynamic pressure of the medium passing through said passage, means for adjusting the effective amount of said passage, and means for automatically controlling the amount of heating medium supplied to said system in response to change of temperature at a key location.

5. In a heating system, the combination of a heating unit, an inlet pipe having a passage for supplying the heating medium, a flexible graduator valve controlling the passage of the heating medium through said pipe in response to the dynamic pressure of the medium passing through said passage, and means for adjusting the effective amount of said passage, said means comprising an adjustable device extending across said passage and extending outside of said pipe, and means for sealing the joint between said device and said pipe.

THOMAS NAPIER ADLAM.